(12) United States Patent
Cognigni et al.

(10) Patent No.: US 7,069,595 B2
(45) Date of Patent: Jun. 27, 2006

(54) METHOD OF CONTROLLING USE OF DIGITALLY ENCODED PRODUCTS

(75) Inventors: Giorgio Cognigni, Rome (IT); Alessio Presciutti, Rome (IT)

(73) Assignee: International Business Machines Corporation, Armonk, NY (US)

( * ) Notice: Subject to any disclaimer, the term of this patent is extended or adjusted under 35 U.S.C. 154(b) by 951 days.

(21) Appl. No.: 09/956,760

(22) Filed: Sep. 20, 2001

(65) Prior Publication Data

US 2002/0138745 A1  Sep. 26, 2002

(30) Foreign Application Priority Data

Mar. 23, 2001  (GB)  ................ 0107323.8

(51) Int. Cl.
G06F 7/04 (2006.01)
G06F 17/30 (2006.01)
H04K 1/00 (2006.01)
H04M 1/68 (2006.01)

(52) U.S. Cl. .............. 726/26; 726/21; 705/59
(58) Field of Classification Search ............ 705/51–52, 705/59; 726/21, 26
See application file for complete search history.

(56) References Cited

U.S. PATENT DOCUMENTS 4,791,565 A   12/1988  Dunham et al.
5,023,907 A * 6/1991  Johnson et al. ............. 710/200
5,708,775 A * 1/1998  Nakamura .................... 714/48
6,023,766 A * 2/2000  Yamamura .................... 726/29
6,049,789 A   4/2000  Frison et al.
6,055,636 A * 4/2000  Hillier et al. ................ 713/200
6,260,141 B1* 7/2001  Park ........................... 713/155
6,658,568 B1* 12/2003  Ginter et al. ............... 713/193

FOREIGN PATENT DOCUMENTS

EP      0 852 349 A2    7/1998
WO      WO 01/95139 A1  12/2001

* cited by examiner

*Primary Examiner*—Kim Vu
*Assistant Examiner*—Peter Poltorak
(74) *Attorney, Agent, or Firm*—Stephen J. Walder, Jr.; Jeffrey S. LaBaw (57) ABSTRACT

A method (400) of controlling use of a software product (or equivalent digitally encoded products) on a data processing system of a customer by a supplier of the product. The method includes the steps of monitoring (433–447) operation of the customer system for detecting a condition of use of the product (such as the number of end-users running the product simultaneously), providing (450–462) reconciliation information indicative of the detected condition of use over a corresponding period of time to a data processing system of the supplier (for example periodically sending a corresponding message through the INTERNET), and updating (471–480) licensing information stored on the supplier system and indicative of a licensing condition of the product according to the reconciliation information.

19 Claims, 7 Drawing Sheets

METHOD OF CONTROLLING USE OF DIGITALLY ENCODED PRODUCTS

FIELD OF INVENTION

The present invention relates to a method of controlling use of digitally encoded products.

BACKGROUND OF THE INVENTION

Digitally encoded products, such as software programs, can be perfectly reproduced in an infinite number of copies. This is a major concern for publishers of the products wishing to protect their intellectual property rights; as a matter of fact, the publishers typically receive royalties for each licensed use of the product, so that any unaccounted use or distribution of the product results in an unpaid royalty. The problem has been exacerbated in the last years by the widespread diffusion of the INTERNET, which further facilitates the uncontrolled distribution of this kind of products.

The most straightforward way of avoiding unaccounted usage of the digitally encoded products is that of preventing unauthorized copying and transmission. For example, most software programs embed control code that limits the number of copies that can be made or disables operation of the product after a predetermined period of time has lapsed. Another technique consists of requiring possession of a software or hardware key for running the product.

A different solution proposed in the art is that of installing a licensing management system on a computer of the customer, which system controls compliance of the products running on the customer computer with respective conditions of use authorised by the publisher (for example defining the maximum number of end-users that can run the product simultaneously). More specifically, the authorised conditions of use (translated into machine-readable form) are embedded in a digital license certificate, which is normally attached to the product. The product includes a call to the licensing management system, so that each time an end-user requires execution of the product a corresponding request is transferred to the licensing management system. The licensing management system verifies if the running of the product falls within the limits set out by the conditions of use embedded in the license certificate; the licensing management system enables or prevents execution of the product according to the result of the verification.

A drawback of the solution described above is that it is quite rigid, since the authorised conditions of use of the product must be agreed upon when the license certificate is installed on the customer computer. Therefore, the customer is compelled to purchase a new license certificate each time a change in an execution environment occurs (such as an increase in the number of end-users running the product simultaneously).

The new license certificate may also be distributed on line, for example through the INTERNET; the customer accesses a web site of the publisher, specifying the features of the new license certificate, and then download the license certificate on his or her computer. In this way, the process of purchasing the new license certificate is less time consuming. However, this solution does not remove the need to purchase a new license certificate for each change in the execution environment.

Open license certificates have been further proposed; in this case, the customer is allowed to make some changes to the authorised conditions of use of the product, in order to adapt the license certificate to the execution environment. The changes to the license certificate are logged by the licensing management system for customer reference. However, the customer is always forced to purchase a license certificate embedding conditions of use corresponding to the broadest envisaged use of the product; as a consequence, the customer incurs higher costs as a trade off for this additional freedom.

It is an object of the present invention to overcome the above-mentioned drawbacks. In order to achieve this object, a method as set out in the first claim is proposed.

DISCLOSURE OF THE INVENTION

Briefly, the present invention provides a method of controlling use of a digitally encoded product on a data processing system including the steps of monitoring operation of the system for detecting a condition of use of the product, providing reconciliation information indicative of the detected condition of use over a corresponding period of time to a controller data processing system, and updating licensing information stored on the controller system and indicative of a licensing condition of the product according to the reconciliation information.

Moreover, the present invention also provides a computer program application for performing the method, a product storing this program application, a corresponding computer program for execution on the data processing system, a product storing this program, a structure for controlling use of the digitally encoded product, and the data processing system for use in this structure.

BRIEF DESCRIPTION OF THE DRAWINGS

Further features and the advantages of the solution according to the present invention will be made clear by the following description of a preferred embodiment thereof, given purely by way of a non-restrictive indication, with reference to the attached figures, in which.

DESCRIPTION OF THE PREFERRED EMBODIMENTS

Figure 1:
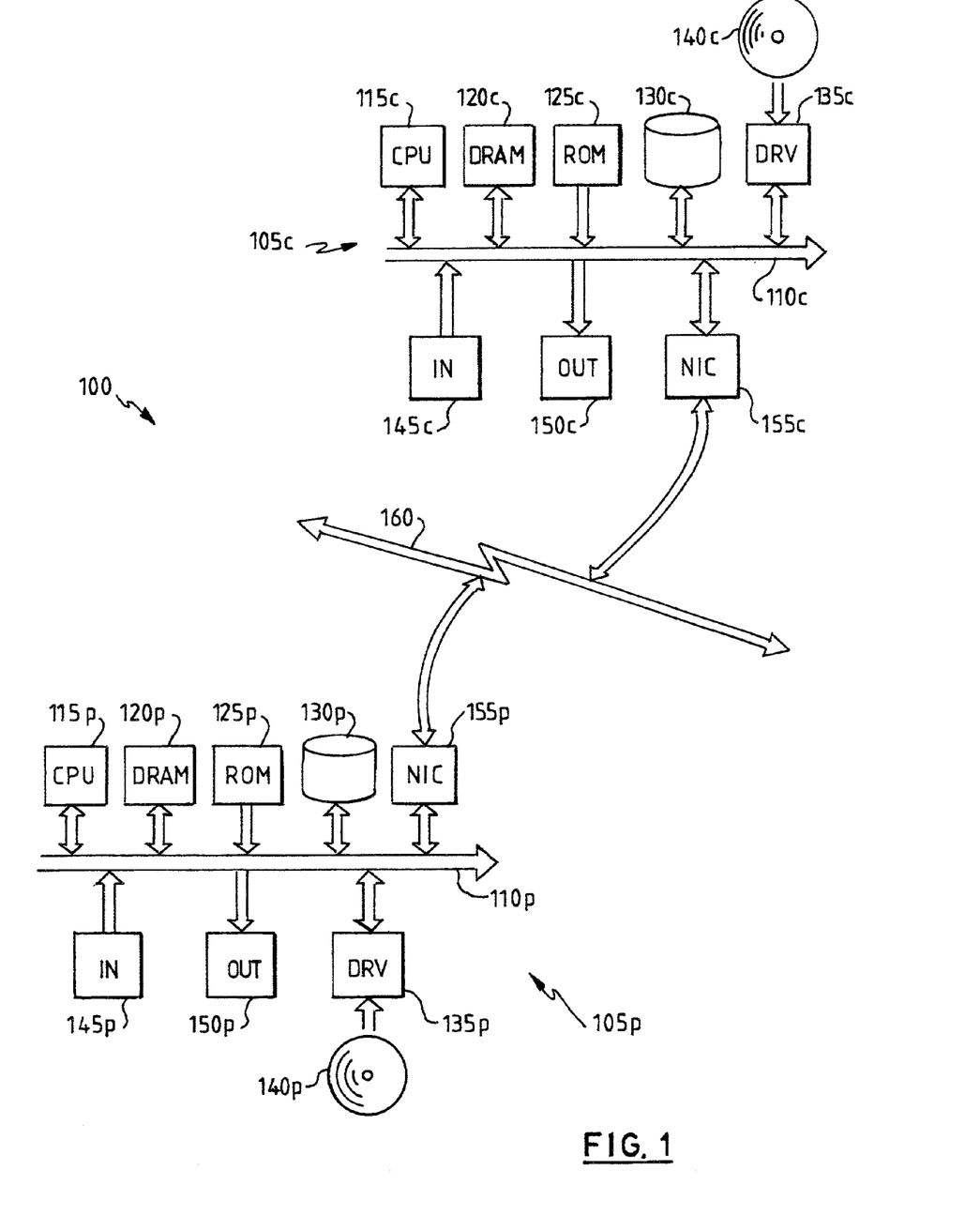
FIG. 1 is a basic block diagram of a structure in which the method of the invention can be used.

With reference in particular to FIG. 1, there is shown a licensing structure 100 for controlling use of software products. The structure 100 includes a computer 105*c*, for example a PC (Personal Computer) that is installed at a site of a customer using the software products. The customer computer 105*c* has several units, which are connected in parallel to a communication bus 110*c*. In particular, a central processing unit (CPU) 115*c* controls operation of the customer computer 105*c*, a working memory 120*c* (typically a DRAM) is used directly by the CPU 115*c*, and a read-only memory (ROM) 125*c* stores a basic program for starting the customer computer 105*c*. Various peripheral units are further connected to the bus 110*c* (by means of respective interfaces). Particularly, a bulk memory consists of a hard-disk 130*c* and of a driver unit (DRV) 135*c* for reading CD-ROMs 140c; the customer computer 105c further includes an input unit (IN) 145c, which consists for example of a keyboard and a mouse, and an output unit (OUT) 150c, which consists for example of a monitor and a printer. A network interface card (NIC) 155c is used to connect the customer computer 105c to a network 160, typically the INTERNET.

A further computer 105p is installed at a site of a publisher of the software products. Particularly, the publisher computer 105p includes a communication bus 110p, a central processing unit (CPU) 115p, a working memory (DRAM) 120p, a read-only memory (ROM) 125p, a hard-disk 130p, a driver unit (DRV) 135p for CD-ROMs 140p, an input unit (IN) 145p, an output unit (OUT) 150p, and a network interface card (NIC) 155p for accessing the network 160.

Similar considerations apply if the computers include different units (for example driver units for floppy-disks), if the computers have a different structure (such as with a multi-processor architecture), if the computers are replaced by equivalent data processing systems, for example having a centralised architecture with a series of dumb terminals or having a distributed architecture with a series of workstations connected to a Local Area Network (LAN), and the like. Alternatively, the licensing structure includes a computer installed at the site of a distributor, or more generally a supplier, of the software products, the licensing structure is employed to control use of equivalent digitally encoded products, such as audio and video recordings, electronic books, or multimedia works. Considering now FIG. 2, there is shown a partial content of the working memories 120p and 120c of the respective publisher and customer computers in operation; the information (programs and data) is typically stored on the hard-disk and loaded (at least partially) into the working memory when the programs are running, together with a corresponding operating system and other application programs (not shown in the figure). The programs are initially installed onto the hard disks of the customer computer and publisher computer from CD-ROM.

Figure 2:
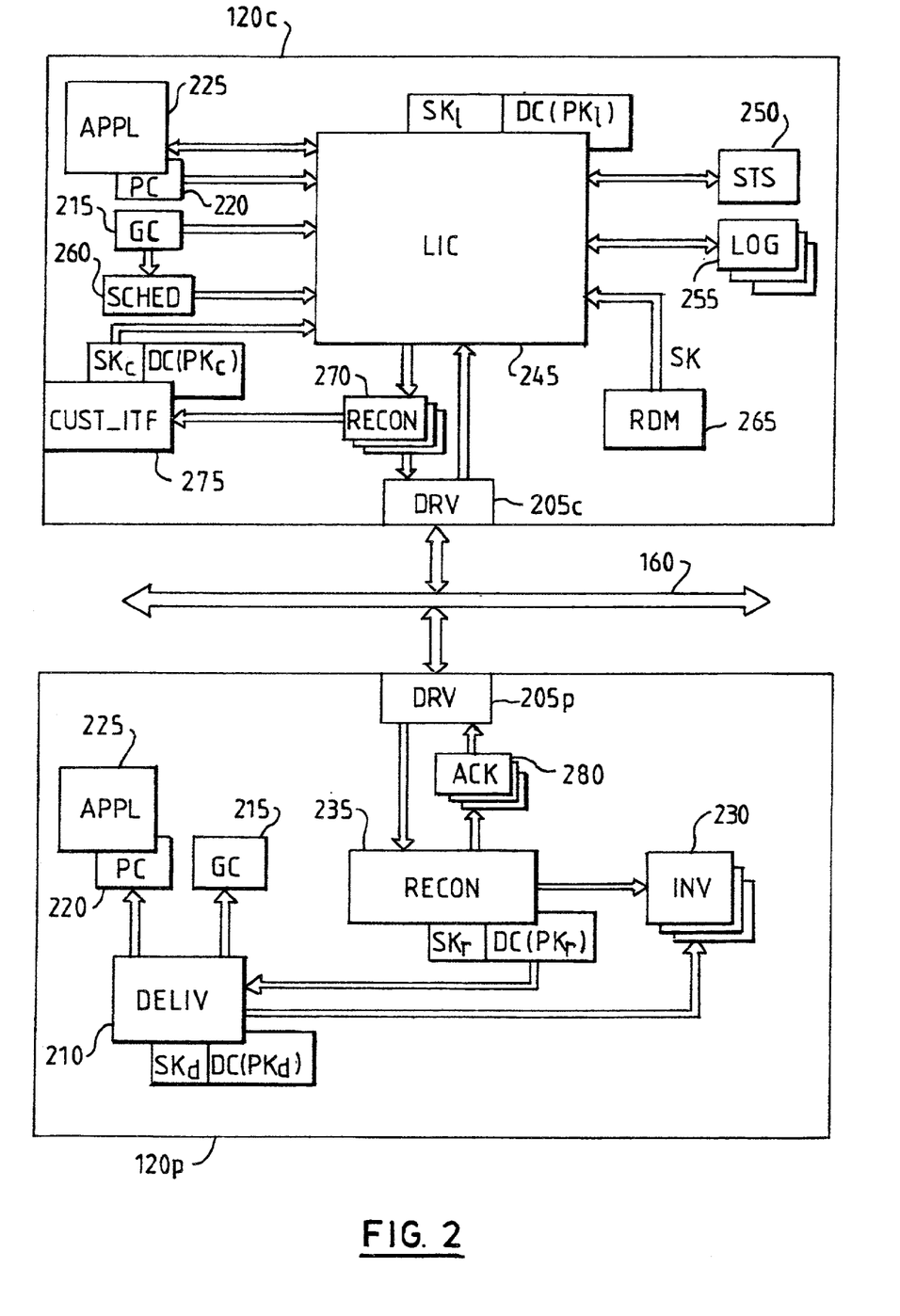
FIG. 2 shows a partial content of a working memory of a customer computer and of a publisher computer included in the structure.

A driver module 205p (on the working memory 120p) and a driver module 205c (on the working memory 120c) control the access of the publisher computer and of the customer computer, respectively, to the network 160.

The publisher computer is provided with a delivery module (DELIV) 210, which generates a global license certificate (GC) 215 and a product license certificate (PC) 220 for a corresponding software product (APPL) 225. Possession of the global license certificate 215 and of the product license certificate 220 authorises the customer to use the software product 225; a different global license certificate 215 is issued for each customer, while a different product license certificate 220 is issued for each software product 225 shipped to the customer.

A (non-confidential) public key PKd and a (confidential) private key SKd are associated with the delivery module 210; this pair of keys is employed in an asymmetric encryption system, for example of the RSA (Rivest Shamir Adelman) type. One of the keys (either the public or the private one) is used to encrypt an original message, that is to transform the original message in an apparently unintelligible form; the other key is used to decipher the encrypted message in order to obtain the original message. The keys are generated so that it is computationally unfeasible to obtain the private key from the public key.

The private key SKd is embodied in the delivery module 210. The public key PKd is included in a digital certificate DC(PKd) associated with the delivery module 210 (for example defined according to the X.509 standard). The digital certificate includes information identifying the owner (for example his or her name, address, and the like), the public key of the owner, and the name of a Certification Authority (CA). The digital certificate further includes a digital signature of the aforementioned information which is created using a private key of the certification authority. In this way, the certification authority guarantees that the owner of the private/public keys pair is actually the entity identified in the digital certificate. The identity of the certification authority is in turn guaranteed by an upper level certification authority, up to a main certification authority generally trusted, so as to define a Public Key Infrastructure (PKI).

The digital signature of a message is created generating a hash value (also known as digital fingerprint or digest) of the message. The hash value consists of a pre-set number of bits, lower than the one required to encode the message directly; nevertheless, the hash value is substantially unique for the message (that is any change in the message generates a different hash value). The hash value is generated using a one-way function, so that it is computationally unfeasible to obtain the message from the hash value. The digital signature is then created by encrypting the hash value with the private key of a sender. A receiver of the (signed) message can validate the same simply generating the hash value of the message and comparing this hash value with the one extracted from the digital signature using the public key of the sender. In this way, the receiver verifies that the original message has not been corrupted (integrity) and that it has been actually sent by the entity identified in the digital certificate (authenticity).

The publisher computer further stores a customer database (INV) 230; the database 230 contains information identifying each customer, such as his or her name, address, VAT number, terms of payment, and the like. In addition, the customer database 230 includes, for each software product installed on the customer computer, respective licensing information, such as terms and conditions, pricing policies, and (authorised) conditions of use of the software product. The terms and conditions define how the software product can be used on the customer computer and possibly further distributed; the pricing policies define how the customer is billed for the use of the software product. For example, the customer is charged according to the maximum number of end-users running the software product simultaneously, according to the computational power of the CPU running the software product, according to the number of terminals connected to the customer computer, and the like.

The delivery module 210 enters information in the customer database 230 every time a new global license certificate 215 or a new product license certificate 220 is shipped to the customer. The information in the customer database 230 is updated under the control of a reconciliation module (RECON) 235. A private key SKr is embodied in the reconciliation module 235. A corresponding public key PKr is included in a digital certificate DC(PKr) associated with the reconciliation module 235; the digital certificate DC(PKr) is accessed by the delivery module 210. The reconciliation module 235 communicates with the driver module 205p, for exchanging information with the customer computer through the network 160.

The global license certificate 215 and the software product 225 with the respective product license certificate 220 are installed on the customer computer. The software product 225 communicates with a licensing management module 245, which accesses the global license certificate 215 and the product license certificate 220. A private key SKl is embodied in the licensing management module 245, and a corresponding public key PKl is included in a digital certificate DC(PKl) associated with the licensing management module 245.

The licensing management module 245 controls a license status file (STS) 250, which stores current licensing information depending on the (actual) conditions of use of the software product 225, and a series of log records (LOG) 255, each one tagged with a respective sequential identifier and storing information relating to a change in the conditions of use of the software product 225 (such as any installation or removal of a license certificate on the customer computer, any log-in or log-off of an end-user, or any upgrade of the CPU). A scheduler (SCHED) 260 activates the licensing management module 245 according to the information included in the global license certificate 215, for example every month. A (confidential) symmetric key SK is generated by a randomiser (RDM) 265, and it is supplied to the licensing management module 245; the symmetric key SK is used both to encrypt an original message and to decipher the encrypted message in order to obtain the original message.

The licensing management module 245 creates a series of reconciliation messages (RECON) 270. The reconciliation messages 270 are accessed by a customer interface (CUST_ITF) 275. A private key SKc is embodied in the customer interface 275, and a corresponding public key PKc is included in a digital certificate DC(PKc) associated with the customer interface 275.

The reconciliation messages 270 are also supplied to the driver module 205c, and then transmitted to the reconciliation module 235 through the network 160. The reconciliation module 235 creates a receipt message (ACK) 280 in response to each reconciliation message 270; the receipt message 280 is supplied to the driver module 205p, and transmitted back to the licensing management module 245 through the network 160.

Likewise considerations apply if the whole program application (programs on the customer computer and programs on the publisher computer) and the corresponding data are structured in a different manner, if other modules or functions are envisaged, and so on.

Figure 3A:
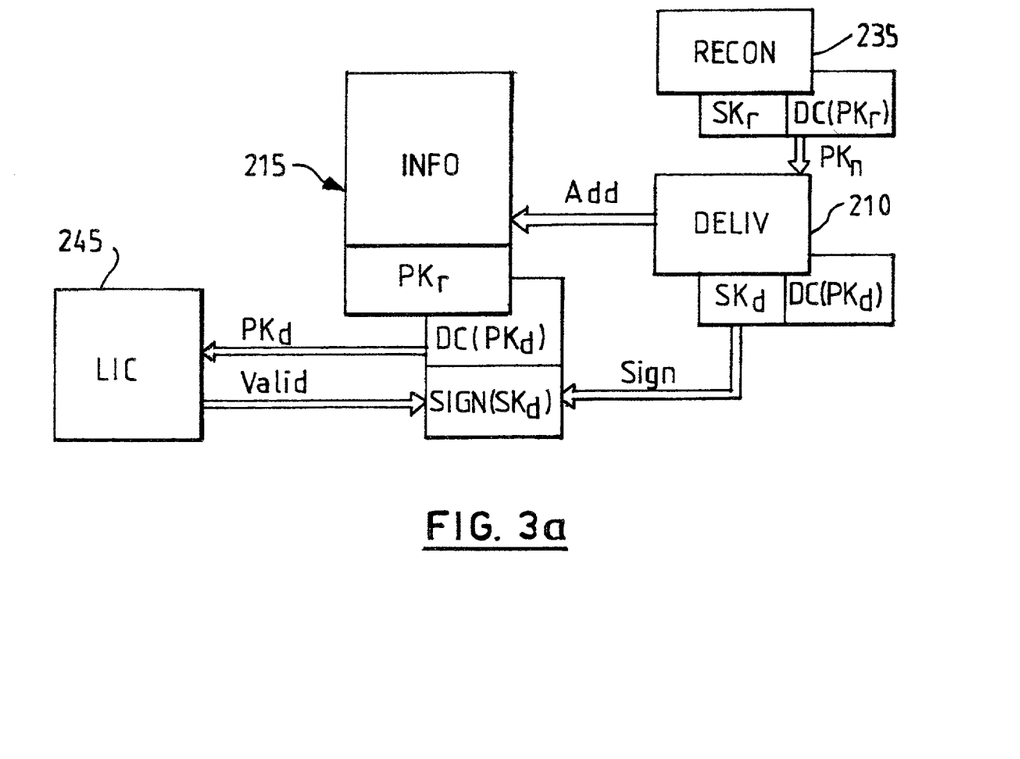
FIGS. 3*a*–3*d* depict some data structures that can be used in the method of the invention.

As shown in FIG. 3a, the global license certificate 215 includes a section INFO, which contains an identifier of the certificate, an identifier of the publisher, a list of general information to be logged on the customer computer, an address of the publisher computer for sending back the reconciliation message (such as an e-mail address), and a frequency of the sending of the reconciliation message; the global license certificate 215 further includes the public key PKr of the reconciliation module 235, which is extracted from the corresponding digital certificate DC(PKr). The global license certificate 215 is created by the delivery module 210 and then signed using the corresponding private key SKd; the digital signature SIGN(SKd) and the digital certificate DC(PKd) associated with the delivery module 210 are then attached to the global license certificate 215. The licensing management module 245 extracts the public key PKd of the delivery module 210 from the corresponding digital certificate DC(PKd), and then verifies the digital signature SIGN (SKd) in order to validate the global license certificate 215. It should be noted that only the public key PKr, and not the whole digital certificate DC(PKr), is included in the global license certificate; in fact the digital signature SIGN(SKd) and the digital certificate DC(PKd) already ensure that the public key PKr has not been corrupted and that it has been actually provided by the publisher.

Figure 3B:
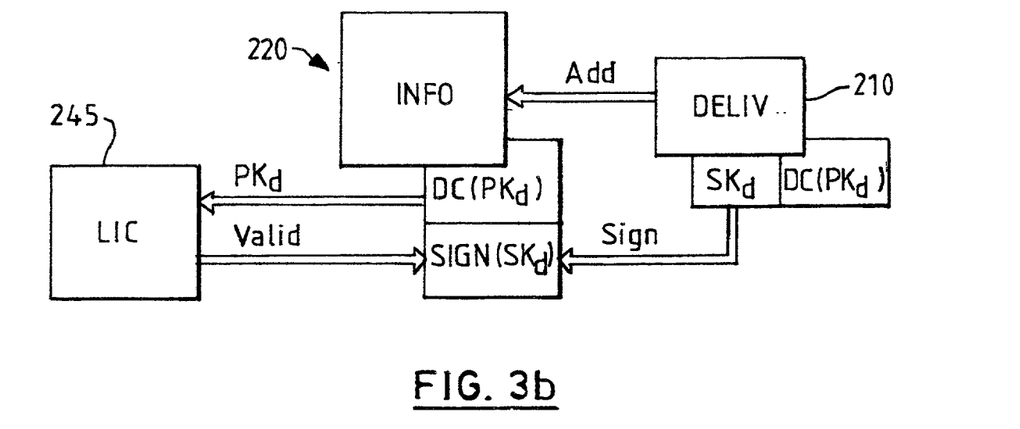

In a similar manner (see FIG. 3b), the product license certificate 220 includes a section INFO, which contains an identifier of the certificate, the identifier of the publisher, basic conditions of use of the respective software product as initially authorised by the publisher, a list of allowed changes to the basic conditions of use, and a list of information to be logged on the customer computer for the specific software product. The product license certificate 220 is created by the delivery module 210 and then signed using the corresponding private key SKd; the digital signature SIGN(SKd) and the digital certificate DC(PKd) associated with the delivery module 210 are then attached to the product license certificate 220. The licensing management module 245 extracts the public key PKd of the delivery module 210 from the corresponding digital certificate DC(PKd), and then verifies the digital signature SIGN(SKd) in order to validate the product license certificate 220.

Figure 3C:
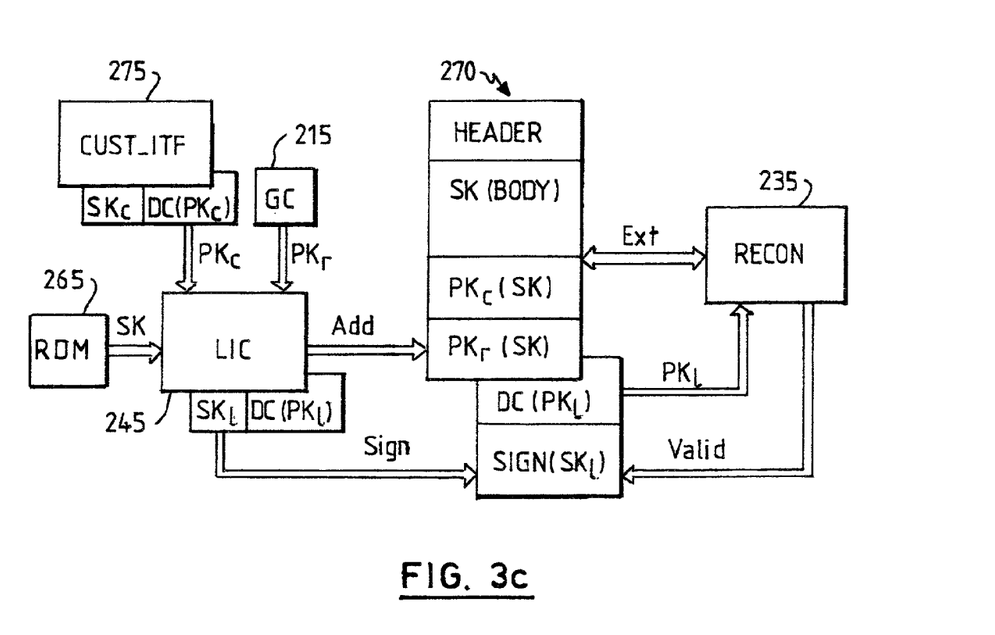

Passing now to FIG. 3c, the reconciliation message 270 includes a section HEADER, which contains an identifier of the licensing management system, the identifier of the publisher, the identifier of the global license certificate installed on the customer computer, and a timestamp indicating the time of creation. A section BODY contains the status information file, the log records, additional information on the customer computer (such as the type of computer and the capacity of the working memory), and an address of the customer computer for sending back the receipt message (such as an e-mail address); the section BODY is encrypted with the symmetric key SK supplied by the randomiser 265. The reconciliation message 270 further includes the symmetric key SK encrypted with the public key PKr of the reconciliation module 235, which is extracted from the global license certificate 215, and the symmetric key SK encrypted with the public key PKc of the customer interface 275, which is extracted from the corresponding digital certificate DC(PKc).

The reconciliation message 270 is created by the licensing management module 245 and then signed using the corresponding private key SKl; the digital signature SIGN(SKl) and the digital certificate DC(PKl) associated with the licensing management module 245 are then attached to the reconciliation message 270. The reconciliation message 270 is also signed by the customer interface 275 using the corresponding private key SKc; the digital signature SIGN (SKc) and the digital certificate DC(PKc) associated with the customer interface 275 are further attached to the reconciliation message 270. The reconciliation module 235 extracts the public key PKl of the licensing management module 245 from the corresponding digital certificate DC(PKl), and verifies the digital signature SIGN(SKl) in order to validate the reconciliation message 270; moreover, the reconciliation module 235 extracts the public key PKc of the customer interface 275 from the corresponding digital certificate DC(PKc), and verifies the digital signature SIGN (SKc) in order to further validate the reconciliation message 270. The reconciliation module 235 decipher the symmetric key SK using the respective private key SKr, and then decipher the section BODY using the symmetric key SK so obtained.

Figure 3D:
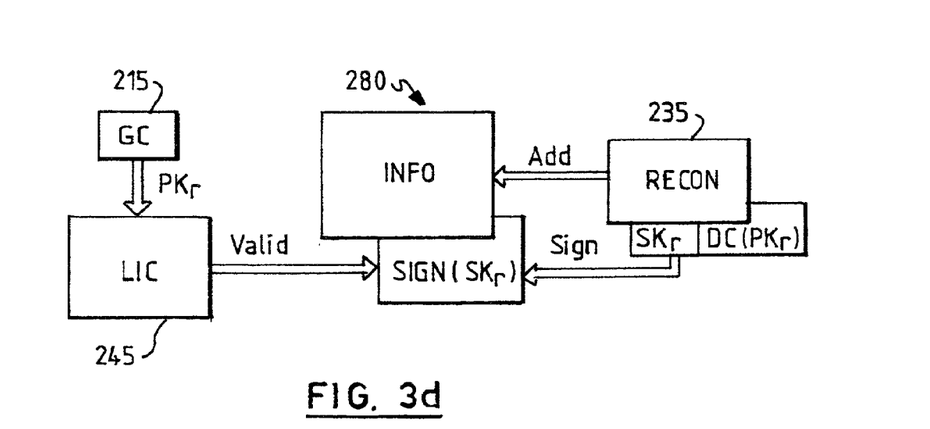

As shown in FIG. 3d, the receipt message 280 includes a section INFO, which contains the identifier of the publisher, the identifier of the licensing management module, and the range of log records received in the corresponding reconciliation message. The receipt message 280 is created by the reconciliation module 235 and then signed using the corresponding private key SKr (SIGN(SKr)). The licensing management module 245 extracts the public key PKr of the reconciliation module 235 from the global license certificate 215, and then verifies the digital signature SIGN(SKr) in order to validate the receipt message 280.

Similar considerations apply if the data structures described above include different information, if they have a different pattern, if the public keys are distributed through secure communication channels (without any digital certificate), and the like.

Figure 4A:
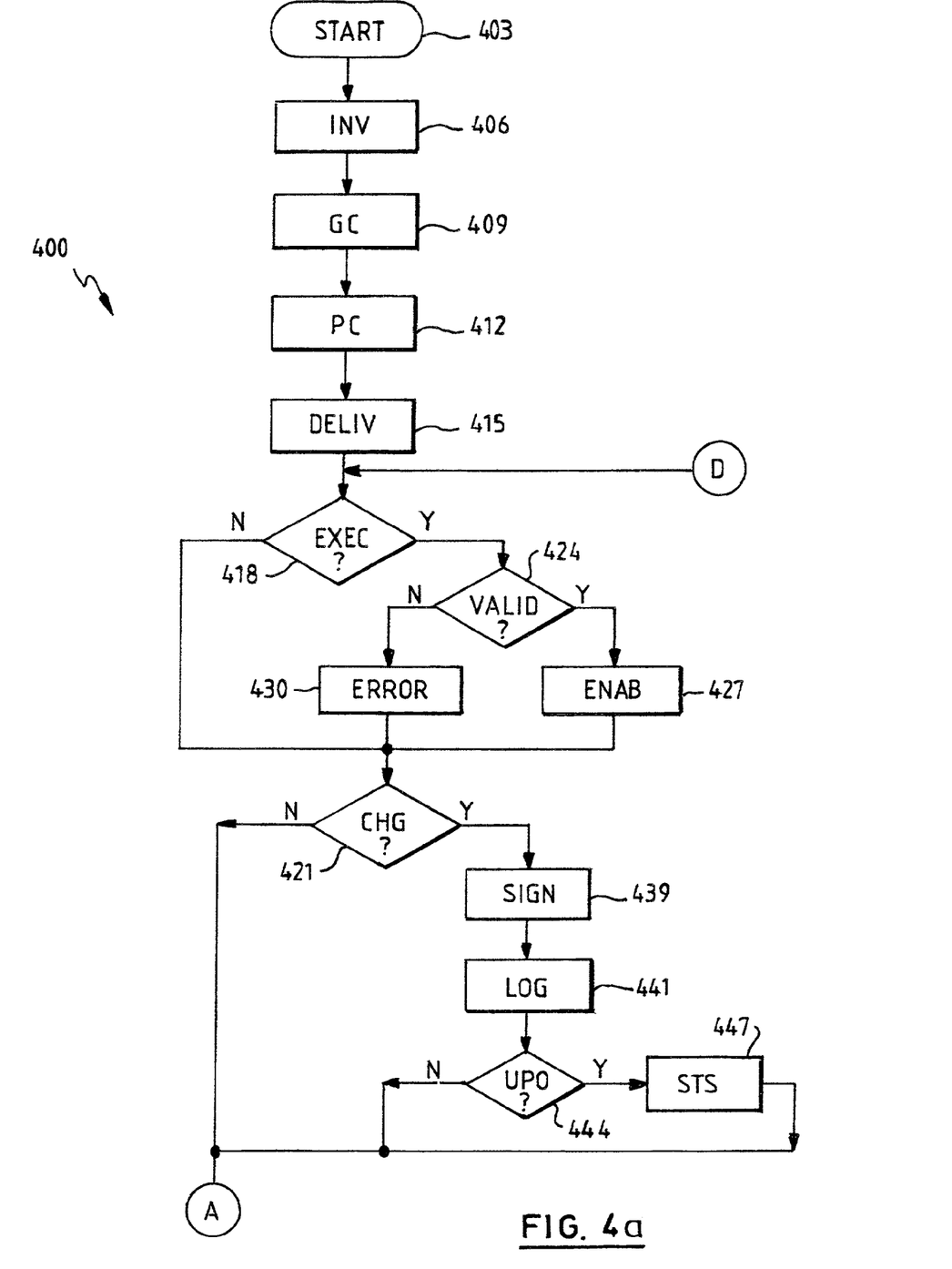
FIGS. 4*a*–4*c* are a flow chart of a method for controlling use of software products on the customer computer.
Figure 4B:
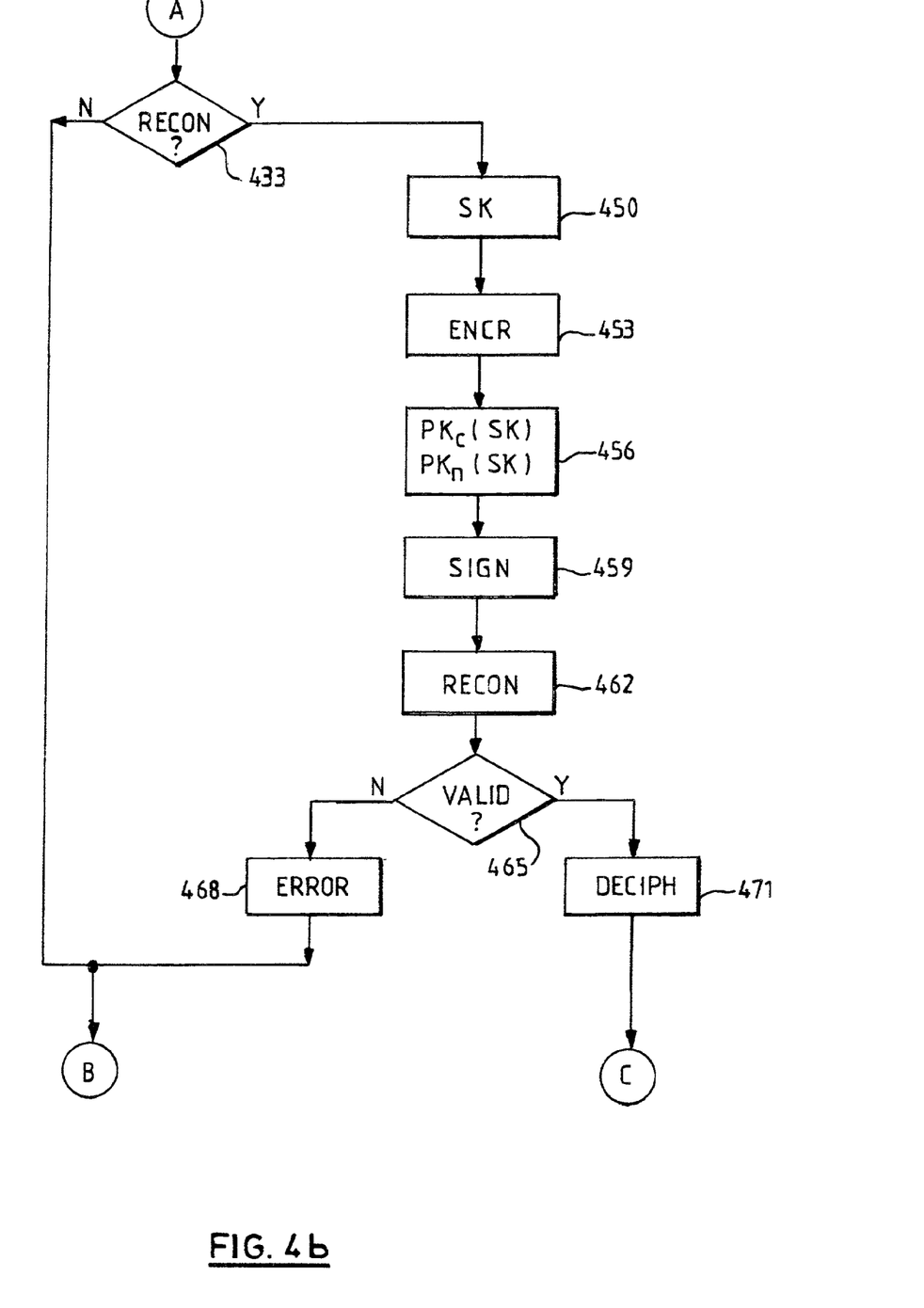
Figure 4C:
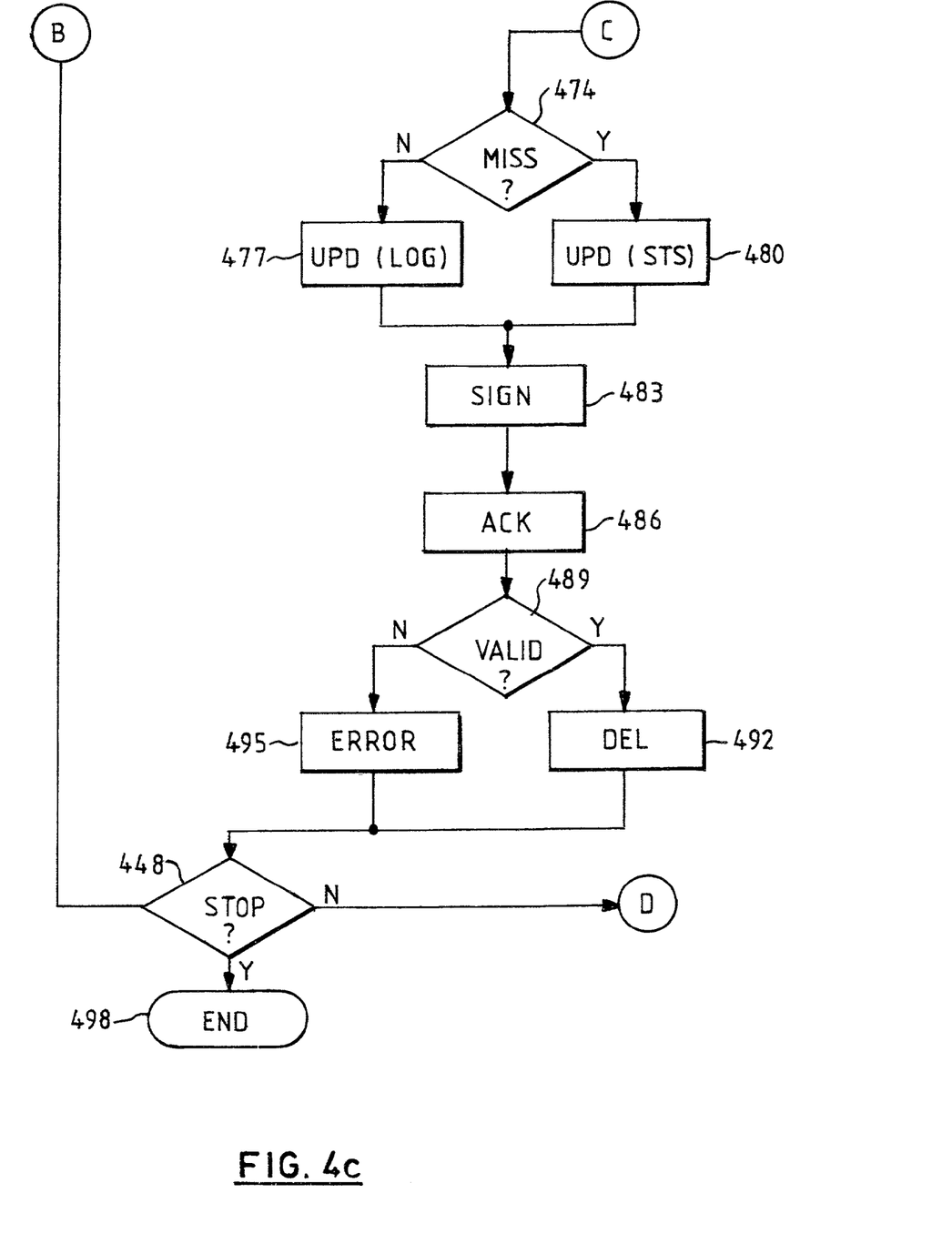

As shown in FIGS. 4a–4c, a series of routines, which together make up a method 400, are performed at successive stages in time in order to control usage of the software product installed on the customer computer. The method starts at block 403 and then passes to block 406, wherein a new entry is added to the customer database by the delivery module when the customer is registered for the first time with the publisher; the delivery module then creates the global license certificate for the customer at block 409. Considering now block 412, the delivery module creates the product license certificate of the software product, when the software product is required for the first time by the customer. Proceeding to block 415, the global license certificate, the product license certificate, and the software product are shipped to the customer (for example through the network) and installed on his or her computer (together with the licensing management module, if necessary).

The licensing management module checks at block 418 whether an execution of the software product has been required on the customer computer by an end-user. If not, the method continues to block 421 (described in the following). Conversely, a check is made at block 424 on the global license certificate and the product license certificate associated with the software product. If valid license certificates are installed on the customer computer, the licensing management module enables execution of the software product at block 427; on the contrary, the execution of the software product is aborted, and the method enters an error condition at block 430 (which is typically logged for further analysis on the part of the publisher). In both cases, the method continues to block 421. Considering now block 421, the method checks whether a change in the conditions of use of the software product has occurred. If not, the method passes to block 433 (described in the following). Conversely, the corresponding event (if of the type included in the list of information to be logged on the customer computer, as indicated in the product license certificate), is recorded and signed by the licensing management module at block 439; the element so obtained is stored as a new log record at block 441. A check is then made at block 444 whether the recorded event involves a change in the current licensing conditions of the software product, for example because a further end-user started using the software product after reaching the maximum number of end-users allowed to run the software product simultaneously. If so, the status information file is accordingly updated at block 447, and the method then proceeds to block 433; conversely, the method continues to block 433 directly.

Considering now block 433, the scheduler checks the current time (provided by an internal clock of the customer computer). If the current time does not correspond to the one planned for sending the reconciliation message to the publisher computer, the licensing management module descends into block 448 (described in the following). Conversely, if the scheduler verifies that the current time corresponds to the one planned for sending the reconciliation message to the supplier computer, a new symmetric key SK is generated by the randomiser at block 450. Descending into block 453, the section BODY of the reconciliation message is encrypted with the symmetric key SK. The symmetric key SK is then encrypted with the public key PKc of the customer interface and with the public key PKr of the reconciliation module at block 456. The licensing management module and the customer interface signs the content of the reconciliation message at block 459; the whole reconciliation message is then sent to the supplier computer at block 462.

The reconciliation module verifies the reconciliation message at block 465. If the reconciliation message is not validated (for example because its content has been corrupted or the digital signatures have been forged), the method enters an error condition at block 468 and then descends into block 448 directly; conversely, the method passes to block 471, wherein the reconciliation module deciphers the section BODY of the reconciliation message using the symmetric key SK (in turn deciphered using the respective private key SKr). A check is then made at block 474 whether one or more log records are missing in the reconciliation message (by scanning the respective sequential identifiers). If no log record is missing, the customer data base is updated at block 477 according to the log records received (for example determining the highest number of end-users running the software product simultaneously during the corresponding period); conversely, the customer data base is updated at block 480 according to the status file, and an error condition is entered (if the status file is missing as well, the customer data base is restored to the basic conditions of use initially authorised by the publisher or to the last status file available).

In both cases, the method proceeds to block 483, wherein the reconciliation module creates and signs the corresponding receipt message. The receipt message is sent to the customer computer at block 486. The licensing management module verifies the receipt message at block 489. If the receipt message is validated, the method passes to block 492, wherein the log records identified in the receipt message are deleted; conversely, the method enters an error condition at block 495. In both cases, the method descends into block 448.

Considering now block 448, a check is made whether the customer computer has been shut down. If not, the method returns to block 418 (for repeating the steps described above). On the contrary, the method ends at the final block 498.

Likewise considerations apply if an equivalent method is performed, for example if the software product and the respective license certificate are distributed separately, if execution of the software product is always enabled (even if a valid license certificate is not installed), if execution of the software product is aborted when a validating error occurs, if the method is implemented with several concurrent processes that execute the above described operations in parallel, if the reconciliation message is sent to the publisher computer with a different frequency (for example every three or six months), and so on. Similarly, use of two or more software products is controlled at the same time, operation of the customer computer is monitored in a different manner, equivalent reconciliation information is provided to the publisher, the reconciliation information is sent to an FTP (File Transfer Protocol) site, or is stored onto a floppy-disk and sent to the publisher by mail.

More generally, the present invention provides a method of controlling use of a software product (or equivalent digitally encoded products) on a data processing system. The method includes the steps of monitoring operation of the system for detecting a condition of use of the product, providing reconciliation information indicative of the detected condition of use over a corresponding period of time to a controller data processing system, and updating licensing information stored on the controller system and indicative of a licensing condition of the product according to the reconciliation information.

The solution of the invention allows the publisher to protect his of her intellectual property rights in an effective manner; at the same time, the publisher is free to negotiate flexible licensing terms and conditions with the customer. On the other hand, the customer is enabled to use the product in a changing execution environment, without having to resort to the publisher continuously.

This solution makes it possible to align the licensing information on the publisher computer with the actual conditions of use of the product.

As a consequence, the publisher may charge the customer for the real use of the product (during the period associated with the reconciliation information), for any change to the authorised conditions of use made by the customer dynamically, or for a combination of these pricing policies. In this way, the customer may discontinue use of the product at any moment, may start using the product several days after it has been purchased, or may have a reduced use of the product than expected without incurring unnecessary costs. Moreover, the publisher may offer innovative licensing terms and conditions to the customer; for example, the customer may be charged according to an average of the use of the product along the period associated with the reconciliation information, or may pay a starting amount defining a credit for the next use of the product (which is allowed until the credit has been completely used up).

Alternatively, the licensing information is employed by the publisher only for recording the real use of the product made by the customer; for example, this information may be advantageously used for marketing or statistical applications.

The preferred embodiment of the invention described above offers further advantages. For example, the proposed solution employs a product license certificate, which does not set any restriction on the conditions of use of the product; this feature makes the structure very flexible, without impacting its reliability. Preferably, the product license certificate defines the information to be detected and provided to the publisher; in this way, different information may be collected for each product. Moreover, the use of the global license certificate makes it possible to change the mode of providing the reconciliation information to the publisher, simply replacing this certificate on the customer computer.

Alternatively, the product license certificate and the global license certificate have a different structure (for example with a constraint defining an expense limit for the customer), the information to be collected is defined elsewhere (for example directly in the product), the same kind of information is collected for all the products, the reconciliation information is always provided to the publisher in the same manner, or no product license certificate and global license certificate are employed.

The log records periodically sent to the publisher computer make the control of the customer computer particularly reliable. The receipt message (causing the log records already sent to the publisher computer to be deleted) ensures a perfect alignment between the customer and publisher computers. Moreover, the use of the sequential identifiers associated with the log records and the use of the status file allow the reconciliation to be carried out even when one or more log records are lost.

Likewise considerations apply if the log records, the status file, and the receipt message have a different structure, or if they are replaced by equivalent information. Alternatively, the log records are created on request by the customer, the log records are not sent to the publisher computer periodically (for example they are sent on request or they are collected by the publisher directly), no receipt message is used and the log records are not deleted (for example they are moved to a history archive for customer reference), no sequential identifiers are attached to the log records, or the licensing management system only stores either the log records or the status file.

The encryption technique proposed for the reconciliation message ensures confidentiality of the information sent to the publisher by the customer. Moreover, the use of the symmetric key allows both the publisher and the customer to decipher the reconciliation message at any moment. The signatures attached to the log records, the reconciliation message and the receipt message prevent any external tempering.

Likewise considerations apply if each symmetric key is stored elsewhere on the customer computer, if the same symmetric key is employed for all the reconciliation messages, if only the reconciliation message and the receipt messages are signed (and not every log record), if the reconciliation message is only signed by the licensing management module (and not by the customer interface); alternatively, the reconciliation message is encrypted with the public key of the reconciliation module (and it is not recorded on the customer computer), the reconciliation message is not encrypted, or no digital signature is employed.

Preferably, the proposed method is employed to control use of the product on the computer of the customer by a supplier of the product, even if other applications are not excluded. For example, in a different embodiment of the invention, the reconciliation information is provided to a generic controller of the same company as the user of the computer.

Advantageously, the solution according to the present invention is implemented with a computer program (software) application, which is provided on CD-ROM. The application consists of a program installed on the publisher computer and a program installed on the customer computer, which are suitable to be distributed separately.

Alternatively, the programs are provided on floppy-disks, are pre-loaded onto the hard-disks, or are stored on any other computer readable medium, are sent to the computers through the network, are broadcast, or more generally are provided in any other form directly loadable into a working memory of the computers. However, the method according to the present invention leads itself to be carried out even with a hardware structure installed on the customer computer, for example integrated in a chip of semiconductor material.

Naturally, in order to satisfy local and specific requirements, a person skilled in the art may apply to the solution described above many modifications and alterations all of which, however, are included within the scope of protection of the invention as defined by the following claims.

What is claimed is:

1. A method of controlling use of a digitally encoded product on a data processing system including the step of:

providing, to the data processing system, a product license certificate indicative of an authorization granted to use the product, wherein the license certificate identifies basic conditions of use of the product as initially authorized by a provider of the product and a list of allowed changes to the basic conditions of use of the product, monitoring operation of the data processing system for detecting a condition of use of the product, providing reconciliation information indicative of the detected condition of use over a corresponding period of time to a controller system, and automatically updating licensing information stored on the controller system, and indicative of a licensing condition of the product, according to the reconciliation information, wherein updating licensing information comprises modifying a previous licensing condition for the corresponding period of time to be a modified licensing condition that corresponds to the detected condition of use of the product as identified by the reconciliation information, and wherein the modified licensing condition governs a relationship between a user of the product and a provider of the product for the corresponding period of time.

2. The method according to claim 1, further including providing a product license certificate indicative of an authorization granted to use the product with no restriction on the condition of use, storing the product license certificate on the data processing system, requiring an execution of the product, verifying the product license certificate, and enabling the execution of the product in response to a positive result of the verification of the product license certificate.

3. The method according to claim 2, wherein the product license certificate further includes a definition of the condition of use to be detected and of the reconciliation information to be provided to the controller system.

4. The method according to claim 1, further including providing a global license certificate defining a mode of providing the reconciliation information to the controller system, and storing the global license certificate on the data processing system.

5. The method according to claim 1, wherein the reconciliation information includes a log record stored on the data processing system for each change of the condition of use of the product, the reconciliation information being periodically sent to the controller system.

6. The method according to claim 5, further including sending a receipt message from the controller system to the data processing system in response to the reconciliation information, and erasing the log records sent to the controller system in response to the receipt message.

7. The method according to claim 5, wherein the reconciliation information further includes a sequential identifier associated with each log record and status information stored on the data processing system and indicative of the current licensing condition of the product, the licensing information being updated according to the status information in response to a missing sequential identifier in the log records sent to the controller system.

8. The method according to claim 1, further including generating a symmetric key for each sending of the reconciliation information to the controller system, encrypting the reconciliation information with the symmetric key, encrypting the symmetric key with a public key of a controller of the use of the product, providing the encrypted symmetric key to the controller system, deciphering the symmetric key using a private key of the controller and deciphering the reconciliation information using the symmetric key.

9. The method according to claim 8, further including signing each log record with a private key of a licensing management module installed on the data processing system, signing the reconciliation information with the private key of the module, validating the reconciliation information and each log record with a public key of the module, signing the receipt message with the private key of the controller, and validating the receipt message with the public key of the controller.

10. A computer program application, on a computer readable medium, directly loadable into a working memory of a data processing structure for performing the method of claim 1 when the program is run on the data processing structure.

11. A computer program, on a computer readable medium, directly loadable into a working memory of a data processing system for performing a method of controlling use of a digitally encoded product on the data processing system including:

providing a product license certificate indicative of an authorization granted to use the product, wherein the license certificate identifies basic conditions of use of the product as initially authorized by a provider of the product and a list of allowed changes to the basic conditions of use of the product, monitoring operation of the data processing system for detecting a condition of use of the product, providing reconciliation information indicative of the detected condition of use over a corresponding period of time to a controller system of a controller, and automatically updating licensing information stored on the controller system, and indicative of a licensing condition of the product, according to the reconciliation information, wherein updating licensing information comprises modifying a previous licensing condition for the corresponding period of time to be a modified licensing condition that corresponds to the detected condition of use of the product as identified by the reconciliation information, and wherein the modified licensing condition governs a relationship between a user of the product and a provider of the product for the corresponding period of time.

12. A structure for controlling use of a digitally encoded product on a data processing system including:

means for providing a product license certificate, to the system, indicative of an authorization granted to use the product, wherein the license certificate identifies basic conditions of use of the product as initially authorized by a provider of the product and a list of allowed changes to the basic conditions of use of the product, means for monitoring operation of the data processing system for detecting a condition of use of the product, means for providing reconciliation information indicative of the detected condition of use over a corresponding period of time to a controller system, and means for automatically updating licensing information stored on the controller system and indicative of a licensing condition of the product according to the reconciliation information, wherein the means for updating licensing information comprises means for modifying a previous licensing condition for the corresponding period of time to be a modified licensing condition that corresponds to the detected condition of use of the product as identified by the reconciliation information, and wherein the modified licensing condition governs a relationship between a user of the product and a provider of the product for the corresponding period of time.

13. The method of claim 1, further comprising:
- performing a check, in the data processing system, as to whether a detected condition of use of the product constitutes a change in a condition of use of the product;
- recording an event in a log on the data processing system if the detected condition of use of the product constitutes a change in a condition of use of the product;
- performing a check, in the data processing system, as to whether the recorded event involves a change in a current licensing condition of the product; and
- updating a status information file based on the recorded event if the recorded event involves a change in a current licensing condition of the product.

14. The method of claim 13, further comprising:
- communicating the status information file to the controller system in accordance with a predetermined schedule.

15. The method of claim 14, further comprising:
- providing, to the data processing system, a product license certificate indicative of an authorization granted to use the product, wherein the product license certificate identifies the predetermined schedule for the data processing system communicating the status information file to the controller system.

16. The computer program of claim 11, wherein the computer program further causes the data processing system to:
- perform a check as to whether a detected condition of use of the product constitutes a change in a condition of use of the product;
- record an event in a log on the data processing system if the detected condition of use of the product constitutes a change in a condition of use of the product;
- perform a check as to whether the recorded event involves a change in a current licensing condition of the product; and
- update a status information file based on the recorded event if the recorded event involves a change in a current licensing condition of the product.

17. The computer program of claim 16, wherein the computer program further causes the data processing system to:
- communicate the status information file to the controller system in accordance with a predetermined schedule defined by a product license certificate indicative of an authorization granted to use the product.

18. The structure of claim 12, wherein the structure further comprises:
- means for performing a check as to whether a detected condition of use of the product constitutes a change in a condition of use of the product;
- means for recording an event in a log on the data processing system if the detected condition of use of the product constitutes a change in a condition of use of the product;
- means for performing a check as to whether the recorded event involves a change in a current licensing condition of the product; and
- means for updating a status information file based on the recorded event if the recorded event involves a change in a current licensing condition of the product.

19. The structure of claim 18, wherein the structure further comprises:
- means for communicating the status information file to the controller system in accordance with a predetermined schedule defined by a product license certificate indicative of an authorization granted to use the product.

* * * * *